United States Patent [19]

Jorgensen et al.

[11] Patent Number: 4,637,639
[45] Date of Patent: Jan. 20, 1987

[54] NON-METALLIC LIQUID-TIGHT CONDUIT ENGAGING CONNECTOR

[75] Inventors: Robert W. Jorgensen, Niles, Mich.; Michael R. Nowak, Mishawaka, Ind.

[73] Assignee: Harvey Hubbell Incorporated, Orange, Conn.

[21] Appl. No.: 757,728

[22] Filed: Jul. 22, 1985

[51] Int. Cl.⁴ .............................................. F16L 33/23
[52] U.S. Cl. ................... 285/249; 285/330; 285/323; 285/913; 285/255
[58] Field of Search ........... 285/248, 249, 330, 382.7, 285/323, DIG. 8, DIG. 14, 322, 255

[56] References Cited

U.S. PATENT DOCUMENTS

| | | | |
|---|---|---|---|
| 145,731 | 12/1873 | Edson | 285/248 |
| 407,456 | 7/1889 | Williams | 285/249 |
| 1,098,294 | 5/1914 | Patty | 285/249 |
| 1,113,770 | 10/1914 | Gabronn | 285/249 |
| 1,486,421 | 3/1924 | Dyer | 285/249 |
| 1,743,922 | 1/1930 | Kirlin | 285/249 |
| 1,746,956 | 2/1930 | Metcalf, Jr. | 285/323 |
| 1,862,833 | 6/1932 | Stover | 285/249 |
| 2,195,492 | 4/1940 | McDonald | 285/DIG. 14 |
| 2,460,653 | 2/1949 | Raybould | 285/249 |
| 3,368,831 | 2/1968 | Phillipps | 285/382.7 |
| 3,606,396 | 9/1971 | Prosdocimo et al. | 285/249 |
| 3,623,753 | 11/1971 | Henry | 285/DIG. 14 |
| 3,980,325 | 9/1976 | Robertson | 285/249 |
| 4,162,802 | 7/1979 | Cox | 285/382.7 |
| 4,303,263 | 12/1981 | Legris | 285/323 |
| 4,341,482 | 7/1982 | Wollensak | 285/330 |

FOREIGN PATENT DOCUMENTS

| | | | |
|---|---|---|---|
| 477129 | 10/1975 | Australia | 285/249 |
| 723052 | 12/1965 | Canada | 285/249 |
| 1168677 | 12/1958 | France | 285/249 |
| 1234206 | 10/1960 | France | 285/249 |
| 2302476 | 9/1976 | France | 285/249 |
| 2394006 | 2/1979 | France | 285/249 |
| 358293 | 12/1961 | Switzerland | 285/249 |
| 809097 | 2/1959 | United Kingdom | 285/249 |

Primary Examiner—Richard J. Scanlan, Jr.
Assistant Examiner—Eric K. Nicholson
Attorney, Agent, or Firm—Jerry M. Presson; Walter C. Farley

[57] ABSTRACT

A connector for engaging non-metallic liquid-tight conduit includes an inner ferrule having a cylindrical portion with an annular rib dimensioned to be inserted into the end of the conduit, and a surrounding sleeve having a conical outer surface and axially extending slots. The sleeve surrounds the conduit and is engaged by a compression nut which radially inwardly decreases the radius of the sleeve, engaging the conduit between the smaller compressed end thereof and the annular rib on the ferrule. The connector also includes a body with threads to engage the nut and the ferrule and body include means for limiting rotational motion of the ferrule.

9 Claims, 8 Drawing Figures

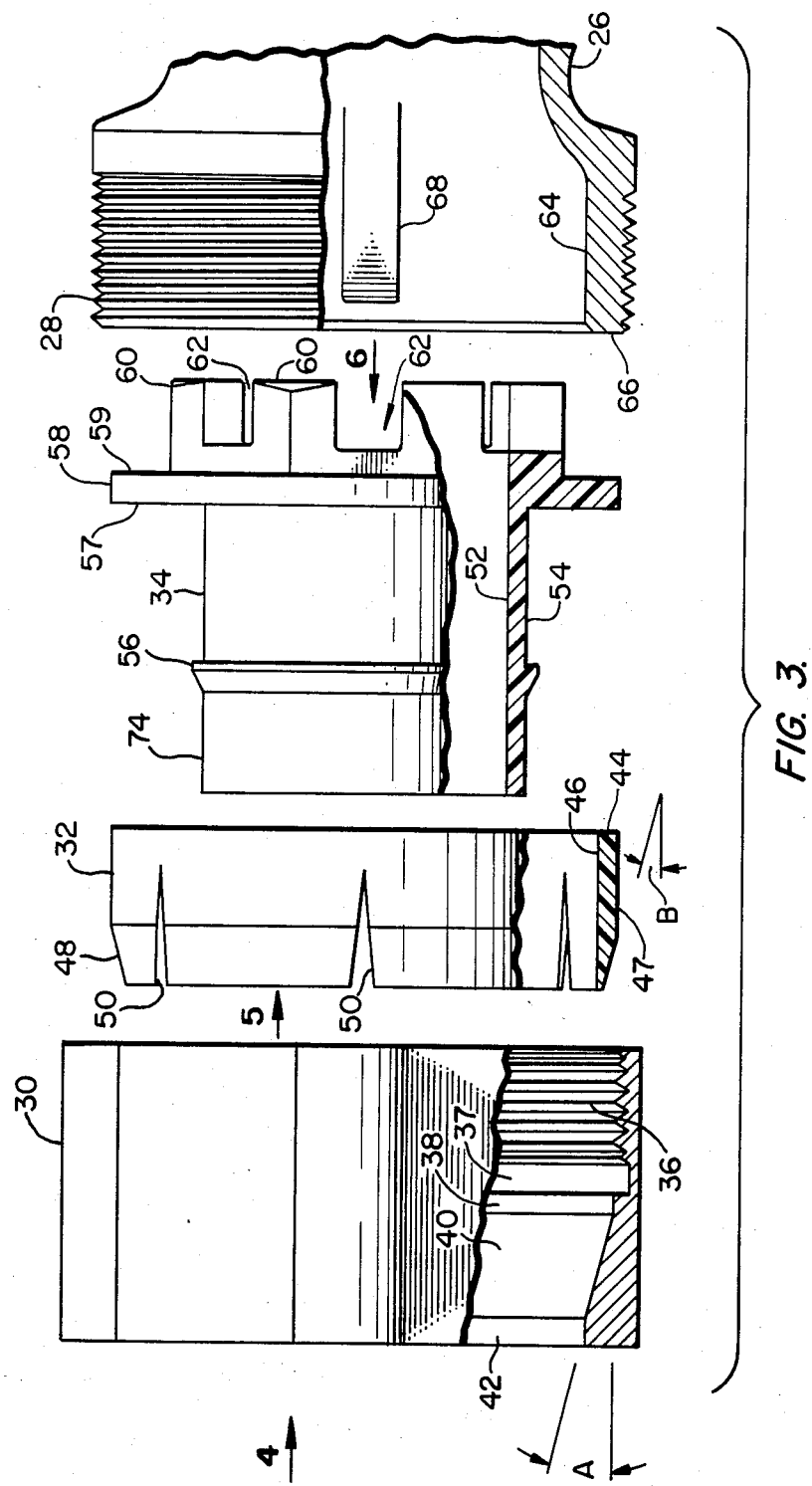

NON-METALLIC LIQUID-TIGHT CONDUIT ENGAGING CONNECTOR

This invention relates to an improved connector for engaging non-metallic conduit in a liquid-tight manner to provide a liquid-free passage for electrical wiring.

BACKGROUND OF THE INVENTION

Non-metallic liquid-tight (NMLT) type I conduit is a form of electrical conduit which has been developed for use in locations where liquid will be present and, in many cases, where electrical conductors must extend between two locations which are expected to move relative to each other. Examples of environments of this type will be found in many machine tools in which an electrically driven or adjusted tool is mounted in a cutting head which repeatedly swings or reciprocates relative to the machine base, and in which a cutting or coolant fluid is sprayed, squirted or flowed around the tool. In order to get power to the moving head, some sort of liquid-resistant conduit must be used, and the conduit is preferably flexible to accommodate the motion.

NMLT type I conduit is, essentially, a rubber tube having inner and outer plies with a woven fiber layer between the two plies. It is produced by several manufacturers to different specifications which, unfortunately, results in considerable variation in the inner and outer diameters, wall thickness and material consistency.

It will be apparent that an MNLT conduit is of little value unless connector fittings can be provided to couple the ends of such conduit to housings or through walls. Such fittings should be easy and quick to assemble on the conduit but, once assembled, they must be liquid-tight and must engage the conduit with sufficient force to withstand a 150 pound pull test prescribed by Underwriters Laboratories, Inc.

In order for the fitting to be easy to assemble, there must be sufficient clearance between the components and conduit to allow the parts to be slipped together but, once assembled, the parts must obviously engage the conduit tightly without "wrinkling" the end of the conduit because such wrinkles can defeat the liquid-tight integrity of the connector.

SUMMARY OF THE INVENTION

An object of the present invention is to provide a connector for NMLT conduit which satisfies the conflicting requirements of being easily assembled but being liquid-tight and capable of withstanding substantial tension after assembly.

A further objective is to provide such a connector which performs the desired functions with conduit having considerable variation in inner diameter, outer diameter and wall thickness.

Briefly described, the invention comprises a connector for forming a liquid-tight and mechanically strong connection with a non-metallic, flexible, liquid-tight electrical conduit comprising the combination of a generally tubular metal body having a substantially flat end face and external threads adjacent said end face, a ferrule having a tubular portion, a radially outwardly protruding flange shaped and dimensioned to lie against said flat end face of said body, the ferrule including a radially outwardly protruding rib axially spaced from the flange and positioned between the flange and one end of the tubular portion, and a tubular sleeve having an outer diameter corresponding to the diameter of the flange. The axial length of the sleeve corresponds to the axial spacing between the rib and the flange. The tubular sleeve also has an inwardly tapering outer surface portion, the sleeve being positioned around the tubular portion of the ferrule with the smaller end of the tapering surface portion radially spaced from the rib to receive an end of the conduit. The sleeve also has a plurality of generally triangular slots extending axially in from the smaller end of the sleeve. A compression nut having an internally threaded portion at one end dimensioned to thready engage the external threads on the body is also provided with an inwardly tapering frustoconical inner surface surrounding the tapering outer surface portion of the sleeve. Thus, when the nut is threaded onto the body with the end of a section of conduit between sleeve and ferrule, the inwardly tapering surface of the nut contacts the tapering outer surface portion of the sleeve and forces that outer surface portion radially inwardly in a uniform fashion, closing the triangular slots and reducing the diameter of the smaller end to engage the conduit between the smaller end and the rib on the ferrule.

BRIEF DESCRIPTION OF THE DRAWINGS

In order to impart full understanding of the manner in which these and other objectives are attained in accordance with the invention, particularly advantageous embodiments thereof will be described with reference to the accompanying drawings, which form a part of the specification, and wherein;

FIG. 3 is an exploded side elevation of the connector of FIGS. 1 and 2;

DESCRIPTION OF A PREFERRED EMBODIMENT

Figure 1:
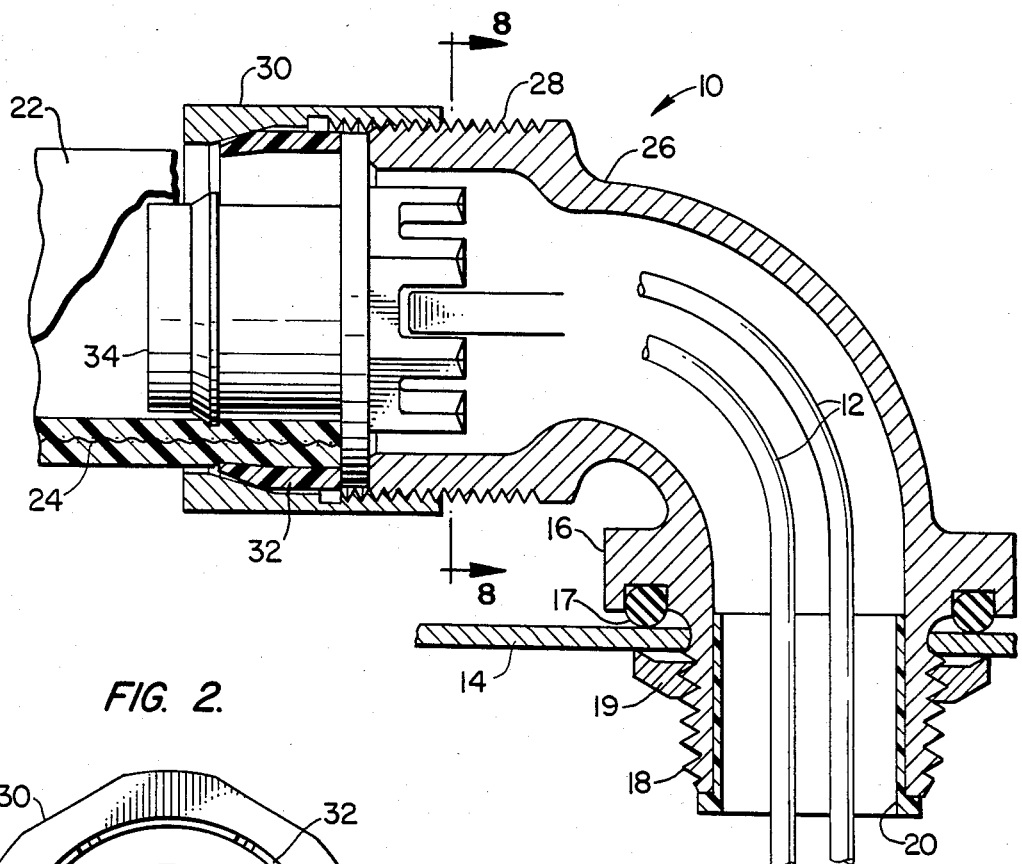
FIG. 1 is a side elevation in partial section of an assembled connector in accordance with the invention.
Figure 2:
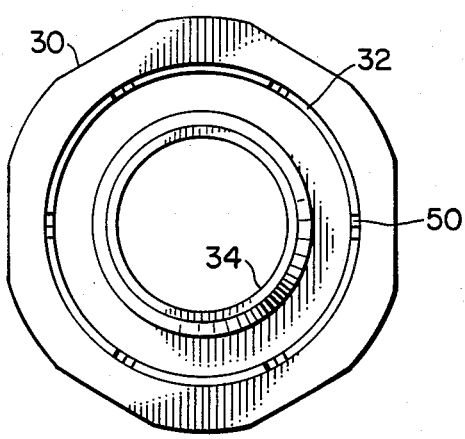
FIG. 2 is an end elevation of the connector of FIG. 1.

Referring first to FIGS. 1 and 2, a connector indicated generally at 10 is shown therein which is being used for the purpose of providing a protected passageway for a plurality of conductors 12 extending through the wall 14 of a housing. For this purpose, one end of connector 10 is provided with a radially outwardly extending flange 16 having a recess to receive an O-ring 17. The end of the connector is externally threaded at 18 to receive a lock nut 19 holding the connector so that O-ring 17 is tightly pressed against the outer surface of wall 14. The interior passage of that end of the connector can be lined with a plastic sleeve 20 to minimize the possibility of damaging the insulation on conductors 12. This end of the connector is conventional.

The other end of the connector is attached to a conduit 22 which is a non-metallic liquid-tight type I conduit comprising rubber or a similar elastomeric material with an interior woven layer 24.

The fitting in accordance with the invention includes a hollow body 26 which can be made of a malleable iron, the end of the body being circular in cross section and having external threads 28 dimensioned to threadedly engage internal threads on a steel compression nut 30. Within nut 30 is a plastic sleeve 32 which engages the outer surface of conduit 22, and a ferrule 34 is provided to extend into the interior of conduit 22.

Figure 4:
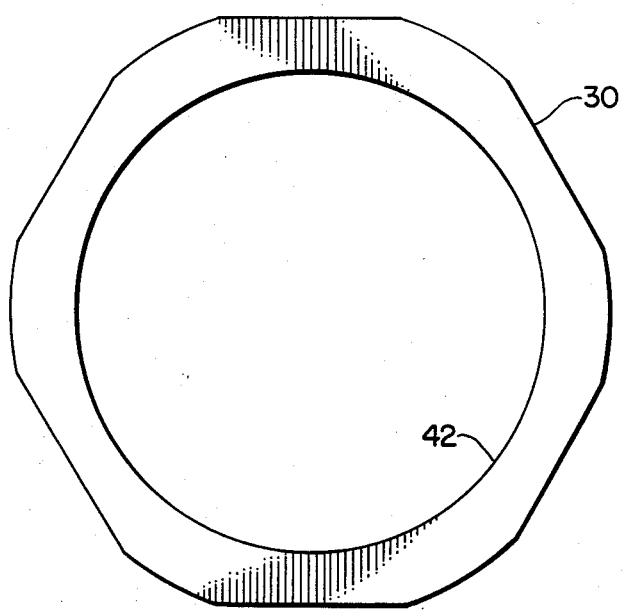
FIG. 4 is an end view of the compression nut portion of the connector of FIG. 3 in the direction of arrow 4.
Figure 5:
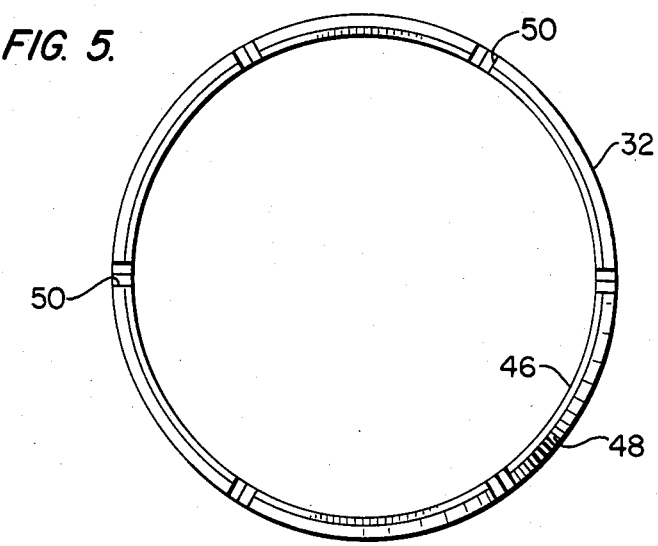
FIG. 5 is an end view of the sleeve portion of the connector of FIG. 3 in the direction of arrow 5.

The individual components of the connector, absent the conduit, are more clearly seen in the exploded view of FIG. 3 in which a portion of each component is in section with the remainder being shown in elevation. Viewing this figure in conjunction with FIGS. 1, 2 and 4, it will be seen that the nut 30 has a generally octagonal outer configuration so as to be easily engageable by a wrench or similar tool. The interior of nut 30 includes a threaded portion 36 to engage threads 28 on body 26, the threaded portion extending inwardly less than half of the axial length of the nut. The threaded portion is followed by an annular groove 37 followed by a shoulder leading to a cylindrical portion 38. A frustoconical surface 40 tapers inwardly from surface 38 at an angle A and terminates in a short cylindrical surface 42 adjacent the outer end of the nut. As will be seen, surface 40 cooperates with a similar surface on sleeve 32 to compress the sleeve.

Sleeve 32 is formed with a flat end face 44 at the larger end and has a cylindrical inner surface 46 in the relaxed, unassembled condition. A portion 47 of the outer surface is also cylindrical, leading to an inwardly tapered portion 48 which is frustoconical and forms an angle B with the outer surface. A plurality of triangular recesses or notches 50 extend inwardly from the smaller end of sleeve 32, and it will be observed that the notches extend through not only the tapered portion but also through a significant part, about half, of the cylindrical portion of the sleeve. The angle between opposite sides of notch 50 is approximately 14 degrees–15 degrees. Sleeve 32 is preferably formed from a polymeric material such as Zytel 101 so as to be quite rigid when thick but to have some resilience when thinner.

Ferrule 34 includes a generally tubular portion having a right circular cylindrical inner surface 52, a circular cylindrical outer surface and a radially protruding rib 56. The ferrule also includes a radially protruding flange 58 which has flat, planar surfaces 57 and 59 on opposite sides thereof. A plurality of castellations 60 protrude axially from face 59, the castellations defining recesses 62 therebetween. The ferrule is also preferably made from a polymeric material such as Zytel 101.

The end of body 26 has external threads 28, as previously mentioned, and has a generally smooth, cylindrical inner surface 64 and a flat end face 66. Surface 64 is interrupted by at least one, but preferably two or more radially inwardly protruding stop members 68. Otherwise, the interior of body 26 is open to provide free passage for the wires 12.

Figure 6:
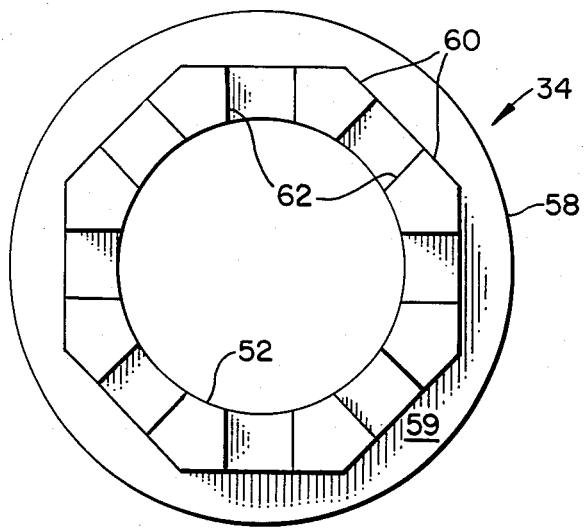
FIG. 6 is an end elevation of the ferrule portion of the connector of FIG. 3 in the direction of arrow 6.
Figure 8:
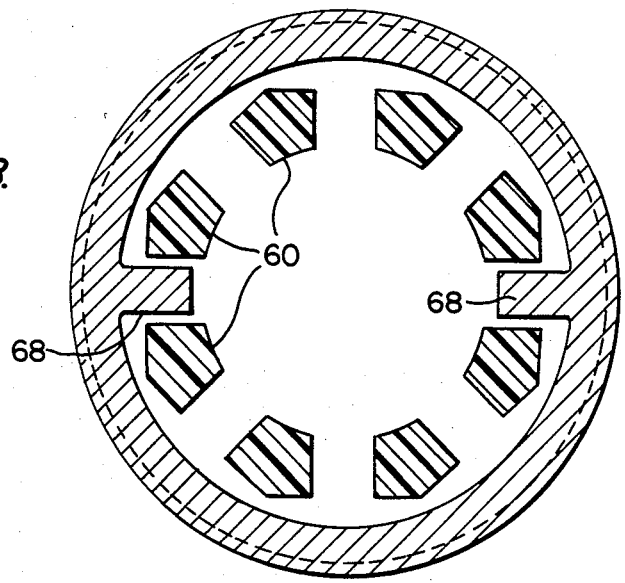
FIG. 8 is a transverse sectional view along line 8—8 of FIG. 1.

As will be recognized from both FIGS. 1 and 3, the outer peripheral dimensions of the castellated portion of ferrule 34 is sufficiently small so as to be easily received within cylindrical surface 64 of the body. When so received, surface 59 of flange 58 abuts end surface 66 of the body and stop members 68 enter recesses 62 at the castellated end of the ferrule. This end of the ferrule is shown by itself in FIG. 6, and the relationship between castellations 60 and stop members 68 is illustrated in the sectional view of FIG. 8 wherein only the ends of castellations 60 are visible. As will be recognized, members 68 and castellations 60 cooperate to define interengaging means to limit rotation of the ferrule relative to the body.

The periphery of the castellated portion of ferrule 34 is octagonal in shape to cooperate with the body of a different embodiment which is not illustrated but will be briefly described. In some arrangements it is desirable to use a straight body 26 which is formed from materials which can be broached. In that body the interior of the end adjacent surface 66 is broached to form an octagonal inner surface which is shaped and dimensional to receive the castellated end of the ferrule, thus defining a different kind of interengaging means to limit rotation. In this alternative embodiment, stop members 68 are omitted.

Figure 7:
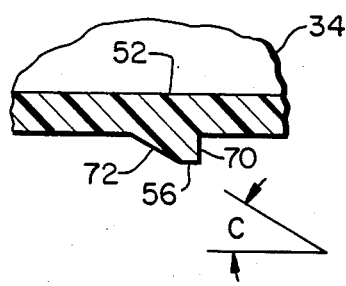
FIG. 7 is an enlarged sectional view of a portion of the ferrule.

The cylindrical portion of the ferrule toward which surface 57 faces includes a first region 54 between surface 57 and rib 56 which is slightly longer than the axial length of sleeve 32. Rib 56 itself, shown in detail in FIG. 7, has a flat surface 70 which is parallel with surface 57 and perpendicular to the axis of the ferrule, and an inclined surface 72 which forms an angle C with the cylindrical surface of the ferrule, this angle preferably being about 30 degrees. The outer limit of the rib is flattened for strength. A further cylindrical portion 74 of the ferrule protrudes beyond the rib and serves as a guide to facilitate entry and coaxial alignment of the ferrule in the interior of the nonmetallic conduit.

The dimensional relationship between the axial length of sleeve 32 and cylindrical portion 54 of the ferrule is particularly important. When assembled, the flat end 44 of sleeve 32 abuts surface 57 of flange 58 and the conduit extends between the surface of portion 54 of the ferrule and the inner surface 46 of the sleeve. The sleeve is intentionally dimensioned so as to loosely surround the conduit and rib 56 is provided with an outer diameter which slides with relatively little frictional engagement into the interior of the conduit, depending on the exact dimensions of the conduit. Surface 42 of nut 30 is also of a larger diameter than the conduit so that all three of the pieces of the connector which surround or come into immediate contact with the conduit can be easily slid into or over the conduit without exerting significant force.

In the assembly process, nut 30 and sleeve 32 are slid over the outside of the conduit and cylindrical portion 74, 54 of the ferrule is inserted into the conduit until the flat end of the conduit itself abuts surface 57. The castellated end of ferrule 34 is then inserted into the end of the body 26 and sleeve 32 is slid along the outer surface of the conduit until it also abuts surface 57. The nut is then moved along the conduit toward the body until threads 36 engage threads 28, whereupon rotation of the nut permits engagement of the threads.

As the nut is further threaded onto the body, conical surface 40 engages surface 48. As will be recognized, the smallest diameter of surface 48 is only slightly larger than the smallest diameter of surface 40. Thus, as the nut is moved axially with respect to the sleeve, the segments of surface 48 between slots 50 are forced radially inwardly in a uniform fashion, causing surface 46 to assume a curved shape and causing the end of surface 46 at the smaller end of the sleeve to press inwardly against the outer surface of the conduit. This radial compression continues until slots 50 are essentially closed, at which time the conduit is trapped between the inwardly bent edge of surface 46 and surface 70 of rib 56. Because of the fact that these edges are slightly axially offset, this engagement of the conduit is not merely a pinching action but involves causing the material of the conduit to assume an S-curve in the region which passes between those components. The result is an extremely strong gripping action which resists axial retraction and which constitutes an excellent liquid seal.

It will be recognized also that the slots 50 do not impair the effect of the fluid seal even if they are not totally closed in the event, for example, or a conduit with a considerably different wall thickness, because additional liquid seal points are formed within the assembly. A primary seal is formed within the conduit between the inner surface thereof and rib 56. A further seal is formed at the abutting end 44 of the sleeve which is pressed against face 57 by the force of nut 30. This force also presses surface 59 against face 66 of the body to form another seal point. An additional O-ring can also be provided in recess 37, is desired.

The assembly can be considered as consisting of two overlapping subassemblies, one being the conduit, nut 30, sleeve 32 and ferrule 34. The engagement of rib 56 with the conduit prevents leakage from the inside to the outside of this subassembly. The body with flange 58 and sleeve 32 is the other subassembly. When the nut is tightened, the wedge angle exerts force through the sleeve to press surface 44 against surface 57 and, through flange 58, to press surface 59 against surface 66.

Forming the sleeve as a separate component contributes to the sealing and mechanical engagement of the fitting. Because it is separate, the entire length of the sleeve is compressed, although in different amounts. This distributes the compression forces over a greater surface area of the conduit and avoids creating a ring of very high stress. If the sleeve were molded as part of the ferrule, the right-hand portion could not compress and the forces would be concentrated in a narrow ring. This concentration of stress would cause the conduit to fail along that ring during a pull test.

In the illustrated embodiment, the body has been shown as a 90° curved member. However, various radius curves and also straight members can be formed employing the same principals as those disclosed herein. Other advantageous features of the construction include the fact that a positive stop is provided on the nut by recess 37 and the shoulder leading to surface 38, preventing overtightening and providing optimum compression of sleeve 32. The choice of materials is also very significant because the relationship between the coefficients of friction of these materials contributes to the beneficial action of the overall combination. In particular, the coefficient of friction between the nut and sleeve, steel to plastic, is low while the coefficient of friction of the sleeve to the conduit (plastic to rubber) is high. Thus, when a pull is exerted on the conduit, the sleeve tends to be pulled with it. This simply increases the wedging action of the sleeve against the nut causing the grip of the sleeve on the conduit to increase with the pull. Also, there is a fairly long section of conduit between rib 56 and surface 57 which is surrounded by sleeve 32. Thus, if the person installing the conduit cuts the end of the conduit on a diagonal rather than in a plane exactly perpendicular to the conduit axis, there is still adequate material between rib 56 and the compressed smaller end of sleeve 32 to guarantee firm engagement, leaving the installer some latitude in his work without impairing the integrity of the connection. Because the engagement is uniform around the entire conduit, pulls on the conduit which are at an angle to the axis of surface 64 do not tend to remove it from the connection but simply increase the gripping force.

While one advantageous embodiment has been chosen to illustrate the invention, it will be understood by those skilled in the art that various changes and modifications can be made therein without departing from the scope of the invention as defined in the appended claims.

What is claimed is:

1. A connector for forming a liquid-tight and mechanically strong connection with a non-metallic, flexible, liquid-tight electrical conduit comprising the combination of
    a generally tubular metal body having a substantially flat end face and external threads adjacent said end face;
    a plastic ferrule having a tubular portion and a radially outwardly protruding flange shaped and dimensioned to lie against said flat end face of said body,
    said ferrule including a radially outwardly protruding rib axially spaced from said flange between said flange and one end of said tubular portion;
    means on said body for engaging said ferrule to limit rotation of said ferrule relative to said body;
    a plastic tubular sleeve having a maximum outer diameter corresponding to the diameter of said flange, a cylindrical inner surface, an axial length substantially equal to the axial spacing between said rib and said flange and having an inwardly tapering outer surface portion, said sleeve being positioned around said tubular portion of said ferrule with the smaller end of said tapering surface portion radially spaced from said rib to receive an end of said conduit, said sleeve having a plurality of generally triangular slots extending axially inwardly only from said smaller end; and
    a metal compression nut having an internally threaded portion at one end dimensioned to threadedly engage said external threads on said body and an inwardly tapering frustoconical inner surface surrounding said tapering outer surface portion of said sleeve,
    whereby threading said nut onto said body causes said inwardly tapering surface of said nut to contact said tapering outer surface portion of said sleeve and force said outer surface portion radially inwardly in a uniform fashion, closing said triangular slots and reducing the diameter of said smaller end to engage said conduit between said smaller end and said rib.

2. A connector according to claim 1 wherein said ferrule includes a plurality of circularly spaced recesses ectending inwardly from the other end of said tubular portion,
    and wherein said means on said body includes a radially inwardly extending stop member engaging one of said recesses.

3. A connector according to claim 2 wherein said rib has a generally triangular shape in cross section and includes a flat face lying in a plane perpendicular to the central axis of said ferrule and facing toward said flange, and a frustoconical face forming a solid angle of about 30° with said axis.

4. A connector according to claim 3 wherein the outer surface of said sleeve includes a right cylindrical portion extending between the larger end of said sleeve and said tapering outer surface portion, and wherein said generally triangular slots extend beyond said tapering outer surface portion and into said cylindrical portion.

5. A connector according to claim 4 wherein said tapering outer surface portion lies in a conical surface forming an angle of about 15° with the central axis of said sleeve.

6. A connector according to claim 5 wherein said frustoconical inner surface of said nut lies in a cone forming an angle of about 15° with the central axis of said sleeve.

7. A connector according to claim 3 wherein the outer surface of said sleeve includes a right cylindrical portion extending between the larger end of said sleeve and said tapering outer surface portion,
and wherein said generally triangular slots extend beyond said tapering outer surface portion and into said cylindrical portion.

8. A connector according to claim 2 wherein the outer surface of said sleeve includes a right cylindrical portion extending between the larger end of said sleeve and said tapering outer surface portion,
and wherein said generally triangular slots extend beyond said tapering outer surface portion and into said cylindrical portion.

9. A connector according to claim 2 wherein the outer surface of said sleeve includes a right cylindrical portion extending between the larger end of said sleeve and said tapering outer surface portion,
and wherein said generally triangular slots extend beyond said tapering outer surface portion and into said cylindrical portion.

* * * * *